United States Patent
Livny et al.

(10) Patent No.: US 11,966,540 B2
(45) Date of Patent: *Apr. 23, 2024

(54) ARTIFICIAL INTELLIGENCE MODEL FOR ENHANCING A TOUCH DRIVER OPERATION

(71) Applicant: Microsoft Technology Licensing, LLC, Redmond, WA (US)

(72) Inventors: Yotam Livny, Gadera (IL); Nir David, Hod Hasharon (IL); Yael Livne, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,114

(22) Filed: Dec. 9, 2022

(65) Prior Publication Data

US 2023/0103621 A1    Apr. 6, 2023

Related U.S. Application Data

(63) Continuation of application No. 17/323,757, filed on May 18, 2021, now Pat. No. 11,526,235.

(51) Int. Cl.
*G06F 3/041* (2006.01)
*G06N 3/044* (2023.01)
*G06N 3/084* (2023.01)

(52) U.S. Cl.
CPC ........ *G06F 3/0418* (2013.01); *G06F 3/04166* (2019.05); *G06N 3/044* (2023.01); *G06N 3/084* (2013.01)

(58) Field of Classification Search
CPC .... G06F 3/0418; G06F 3/04166; G06F 3/044; G06N 3/044; G06N 3/084; G06N 3/045
See application file for complete search history.

(56) References Cited

U.S. PATENT DOCUMENTS

| | | | | |
|---|---|---|---|---|
| 8,436,821 B1 * | 5/2013 | Plichta | ................ | G06F 3/04883 345/173 |
| 9,075,464 B2 * | 7/2015 | Mankowski | .......... | G06F 3/0488 |
| 9,286,482 B1 * | 3/2016 | Dumont | ................... | G06F 21/32 |
| 10,650,290 B2 * | 5/2020 | Singh | ................ | G06V 30/1423 |
| 11,526,235 B1 * | 12/2022 | Livny | ................... | G06N 3/044 |

(Continued)

*Primary Examiner* — Benyam Ketema
(74) *Attorney, Agent, or Firm* — Alleman Hall & Tuttle LLP

(57) ABSTRACT

A computing system includes a touch-sensitive display and one or more processors. The touch-sensitive display is configured to detect a run-time touch input from a user. The one or more processors are configured to execute instructions using portions of associated memory to implement a touch driver of the touch-sensitive display and an artificial intelligence model. The touch driver is configured to process the run-time touch input based on a plurality of calibration parameters and output a touch event and a plurality of run-time touch input parameters associated with the touch input event. The artificial intelligence model is configured to receive, as input, the run-time touch input parameters. Responsive to receiving the run-time touch input parameters, the artificial intelligence model is configured to output a personalized user touch driver profile including a plurality of updated calibration parameters for the touch driver.

20 Claims, 11 Drawing Sheets

(56) References Cited

U.S. PATENT DOCUMENTS

| | | | |
|---|---|---|---|
| 2008/0165141 A1* | 7/2008 | Christie | G06F 3/0482 345/173 |
| 2011/0314427 A1* | 12/2011 | Sundararajan | G06F 9/451 345/173 |
| 2012/0007821 A1* | 1/2012 | Zaliva | G06F 3/04166 345/173 |
| 2012/0162111 A1* | 6/2012 | Lee | G06F 3/04883 345/173 |
| 2012/0319948 A1* | 12/2012 | Kim | G06F 3/04883 345/158 |
| 2013/0120298 A1* | 5/2013 | Zhou | G06F 3/04842 345/173 |
| 2014/0143404 A1* | 5/2014 | Kennedy | H04L 67/52 709/224 |
| 2014/0247251 A1* | 9/2014 | Zhang | G06F 3/0488 345/178 |
| 2015/0066762 A1* | 3/2015 | Chatterton | G06Q 20/322 705/44 |
| 2015/0094127 A1* | 4/2015 | Canose | G06F 3/04842 463/2 |
| 2015/0286338 A1* | 10/2015 | Zhang | G06F 3/0488 345/178 |
| 2016/0140623 A1* | 5/2016 | Gupta | G06Q 30/0204 705/14.66 |
| 2017/0230363 A1* | 8/2017 | Deutschmann | H04W 12/065 |
| 2018/0150280 A1* | 5/2018 | Rhee | G06F 9/451 |
| 2018/0181245 A1* | 6/2018 | Beck | G06F 3/04883 |
| 2018/0224958 A1* | 8/2018 | Sadahiro | G06F 3/04162 |
| 2018/0239526 A1* | 8/2018 | Varanasi | G06F 3/04883 |
| 2018/0253209 A1* | 9/2018 | Jaygarl | G06F 9/451 |
| 2019/0069154 A1* | 2/2019 | Booth | H04W 4/90 |
| 2019/0370617 A1* | 12/2019 | Singh | G06T 11/60 |
| 2020/0027554 A1* | 1/2020 | Boroczky | G16H 30/40 |
| 2020/0234198 A1* | 7/2020 | Feng | G06F 21/57 |
| 2020/0252214 A1* | 8/2020 | Cheng | H04L 9/3213 |
| 2020/0257847 A1* | 8/2020 | El-Rayes | G06F 40/14 |
| 2021/0011592 A1* | 1/2021 | Liu | G06F 3/0482 |
| 2021/0217406 A1* | 7/2021 | Jang | G10L 15/063 |
| 2022/0076385 A1* | 3/2022 | K S | G06T 5/002 |
| 2023/0103621 A1* | 4/2023 | Livny | G06N 3/084 345/173 |

* cited by examiner

ARTIFICIAL INTELLIGENCE MODEL FOR ENHANCING A TOUCH DRIVER OPERATION

CROSS REFERENCE TO RELATED APPLICATIONS

This application is a continuation of U.S. patent application Ser. No. 17/323,757, filed May 18, 2021, the entirety of which is hereby incorporated herein by reference for all purposes.

BACKGROUND

Computing devices with touch-sensitive displays enable a user to interact with the computer via touch from a stylus or a digit. The touch-sensitive displays are configured for universal use, regardless of user characteristics such as handedness, writing pressure, writing speed, pen tilt, and the like.

SUMMARY

To address the issues discussed herein, a computing system is provided. According to one aspect, the computing system includes a touch-sensitive display and one or more processors. The touch-sensitive display is configured to detect a run-time touch input from a user. The one or more processors are configured to execute instructions using portions of associated memory to implement a touch driver of the touch-sensitive display and an artificial intelligence model. The touch driver is configured to process the run-time touch input based at least in part on a plurality of calibration parameters and output a touch event and a plurality of run-time touch input parameters associated with the touch input event. The artificial intelligence model is configured to receive, as input, the run-time touch input parameters. Responsive to receiving the run-time touch input parameters, the artificial intelligence model is configured to output a personalized user touch driver profile including a plurality of updated calibration parameters for the touch driver.

In some configurations, the artificial intelligence model is trained in an initial training phase with a training data set that includes a plurality of training data pairs. Each training data pair may include training phase touch input parameters indicating a characteristic of the touch input and ground truth output indicating calibration parameters for the paired touch input parameters. Training phase touch input parameters from a plurality of users may be interpreted by a clustering algorithm to identify a plurality of user clusters, and each user cluster may define a cohort of users. The training data set used to train the artificial intelligence model may be created from training data examples derived from a cohort of users.

In some configurations, the artificial intelligence model is trained in a feedback training phase. The artificial intelligence model may collect user feedback via an implicit or explicit user feedback interface and perform feedback training based at least in part on the user feedback. The artificial intelligence model may be further configured to adjust internal weights to enhance one or more calibration parameters via a backpropagation algorithm.

In some configurations, the artificial intelligence model includes one or more neural networks. A first neural network of the one or more neural networks may be configured to output an X coordinate offset and a Y coordinate offset of the touch input. When the touch input is performed with a stylus, a second neural network of the one or more neural networks may be configured to output a tilt offset and an azimuth offset of the touch input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Several significant challenges exist to the effective implementation of personalized human-computer interactions (HCI) in modern computing systems. Touch input from a stylus or a digit of a user has become a prominent HCI tool. However, a need exists to personalize the HCI and replace generic procedures that produce a single set of touch input parameters regardless of a user's personal preferences or touch input characteristics. Training an artificial intelligence model to recognize user-specific touch input parameters and adapt processing of the touch input accordingly would improve the user experience and lead to an efficient and more natural HCI. Further, tuning the touch input during run-time would provide a consistent user experience, even under conditions of fatigue. Recognizing user-specific touch input parameters at run-time would additionally facilitate calibrating the touch input according to different users of the same computing device, resulting in a smooth transition between users and/or mode of touch input. A computing system with an artificial intelligence model configured to enhance a touch driver operation according to a user's profile and preferences would increase the user's comfort and enhance productivity, both during touch input from a digit or hand of the user, as well as from a stylus. However, heretofore challenges have existed in the development of such a system.

Figure 1:
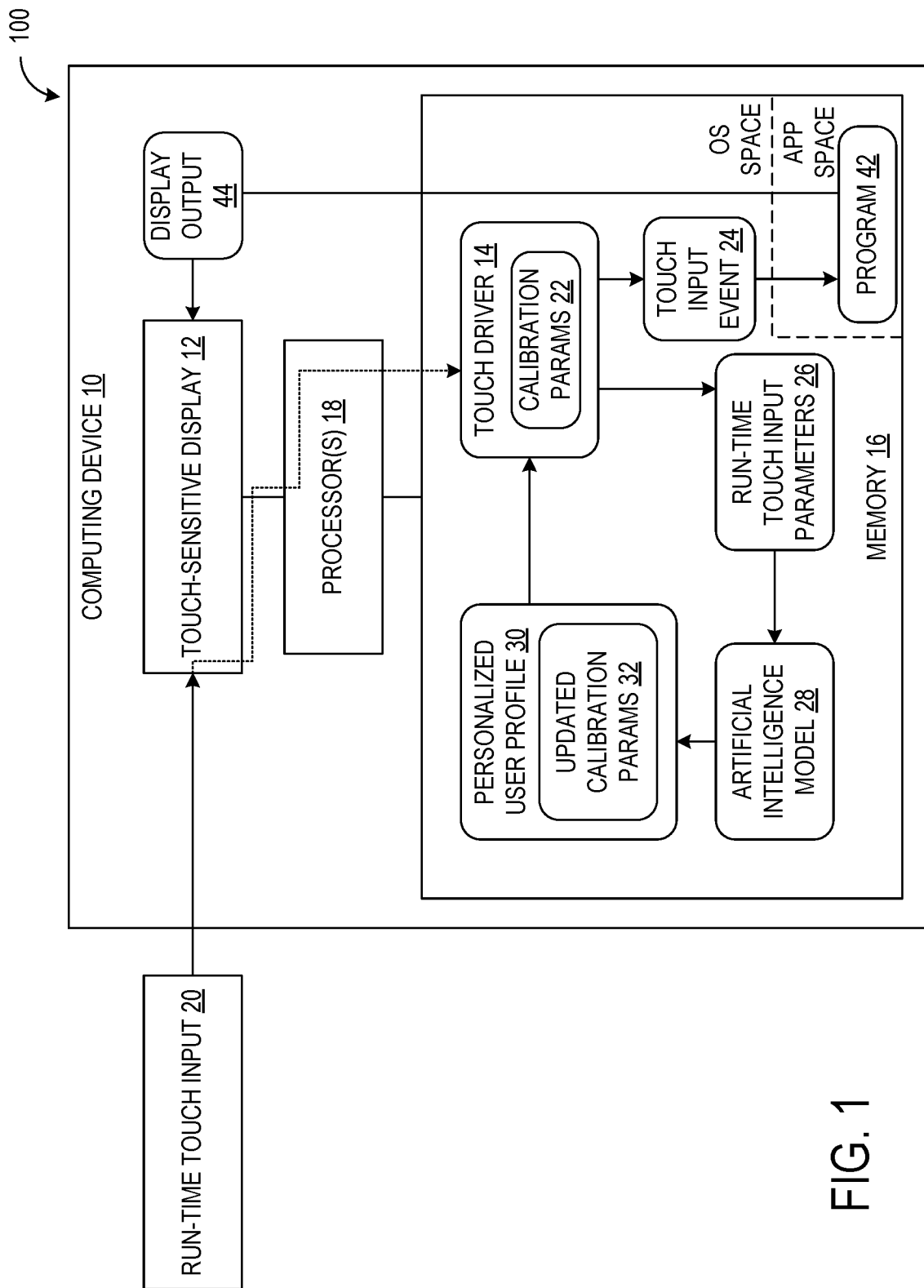
FIG. 1 is a general schematic diagram of a computing system for enhancing a touch driver operation according to an embodiment of the present disclosure.

As schematically illustrated in FIG. 1, to address the above identified issues, a computing system 100 for enhancing a touch driver operation is provided. The computing system 100 includes a computing device 10, which may, for example, take the form of a desktop computing device, laptop computing device, or a mobile computing device, such as a tablet. In another example, the computing device 10 may take other suitable forms, such as a smart phone device, a wrist mounted computing device, or the like. The computing device 10 includes a touch-sensitive display 12 configured to detect touch input from digit or stylus of a user, as described in detail below. It will be appreciated that "touch input" as used herein refers both to touch input from a digit or hand of a user, as well as touch input from a stylus, unless otherwise specified.

A touch driver 14 of the touch-sensitive display 12 is stored in an associated memory 16 and implemented by one or more processors 18. In a run-time phase, the touch driver 14 is configured to process the run-time touch input 20 based at least in part on a plurality of calibration parameters 22. The calibration parameters 22 may include, for example, X coordinate and Y coordinate offsets based at least in part on the sensed position of the detected touch input 20 and/or tilt and azimuth offsets based at least in part on a sensed thickness of the detected touch input 20. Upon processing the run-time touch input 20, the touch driver 14 outputs a touch input event 24 and a plurality of run-time touch input parameters 26. The touch input event may be passed to a program 42, which in turn generates display output 44 based thereon. The run-time touch input parameters 26 may be stored in memory as they are gathered over a period of time based at least in part on a series of run-time touch inputs, and may be characteristics associated with each touch input event 24 such as measurements of digit size, handedness, inking smoothness, stroke speed, stutter, latency, accuracy, repeatability, pressure, tilt, and azimuth. The memory 16 further includes an artificial intelligence model that may be implemented as a touch driver enhancer artificial intelligence model 28. The touch driver enhancer artificial intelligence model 28 is configured to receive the run-time touch input parameters 26 and, in response, output a personalized user touch driver profile 30 that is enhanced according to the processed touch input 20 and includes a plurality of updated calibration parameters 32 for the touch driver 14. In one example, the touch driver enhancer artificial intelligence model 28 is configured to optimize the touch driver profile 30 by computing updated calibration parameters 32 that optimize the performance of the touch driver 14. In other examples, the touch driver enhancer artificial intelligence model 28 may be configured to output updated calibration parameters 32 that are an improvement over the original calibration parameters 22, but are not necessarily optimized.

Figure 2:
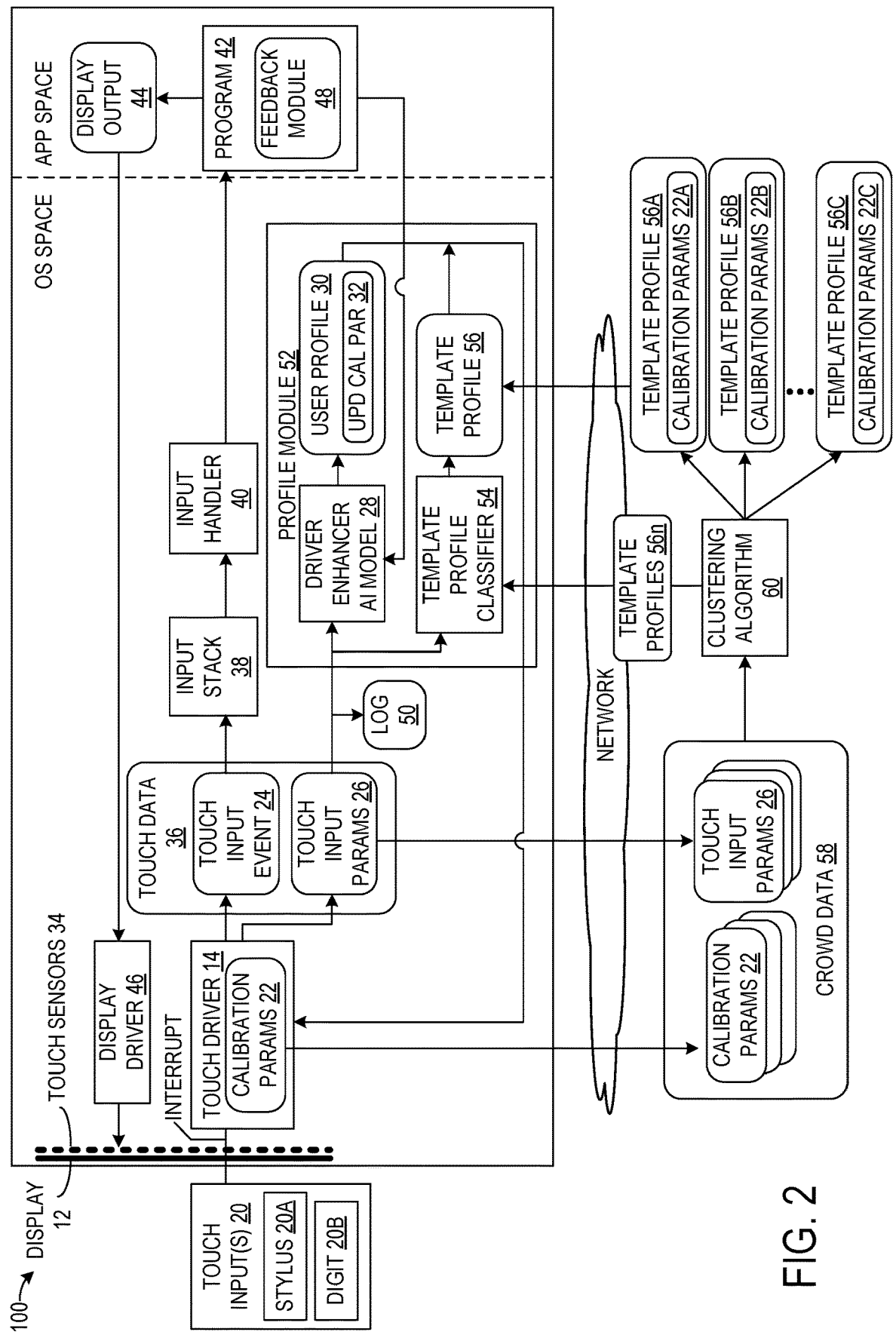
FIG. 2 is a detailed schematic diagram of the computing system of FIG. 1.

A detailed schematic diagram of the computing system 100 is illustrated in FIG. 2. As described above, the touch input 20 may be performed with a stylus 20A or one or more digits 20B of the user. The touch-sensitive display 12 may be configured as a capacitive touch screen equipped with a plurality of conductive layers. The touch-sensitive display 12 may further include a digitizer layer that enables the computing device 10 to be used with an active stylus 20A, such as a digital pen. The touch input 20 may be detected via sensors 34, such as touch sensors that detect stimulation of an electrostatic field of the touch-sensitive display 12 and/or sensors in the digitizer layer. The touch input 20 is processed by the touch driver 14 based at least in part on calibration parameters 22 associated with the touch input 20. The touch driver 14 then outputs touch data 36 including the touch input event 24 and a plurality of run-time touch parameters 26 associated with the touch input event 24.

The touch input event 24 is transferred to an input stack 38, and an input handler 40 sends it to an application program 42. The application program 42 is configured to convert data from the touch input event 24 into a display output 44 that is sent to a display driver 46 to be displayed to the user on the touch-sensitive display 12. As described below, the application program 42 further includes a feedback module 48 configured to communicate data from the touch input event 24 associated with the touch input 20 to the touch driver enhancer artificial intelligence model 28 where it may be used to enhance the touch driver 14 according to characteristics of the user's touch input 20.

The touch input parameters 26 are recorded in a log 50 and sent to a profile module 52 that includes the touch driver enhancer artificial intelligence model 28. As described above with reference to FIG. 1, the touch driver enhancer artificial intelligence model 28 outputs a personalized user touch driver profile 30, including updated calibration parameters 32, based at least in part on the run-time touch input parameters 26 associated with the user's touch input 20. The updated calibration parameters 32 are sent to the touch driver 14 such that the touch driver 14 may be updated with the personalized user touch driver profile 30.

The profile module 52 further includes a template profile classifier 54 that is configured to receive the run-time touch input parameters 26, classify them according to a plurality of user template profiles, and output a template profile 56 for the user performing the touch input 20. As described in detail below with reference to FIGS. 3-5, calibration parameters 22 and touch input parameters 26 associated with the touch input 20 are additionally collected as crowd data 58 and interpreted with a clustering algorithm 60 to identify user clusters 62 that each define a cohort of users. Template profiles are created for each cohort of users, with each template profile including calibration parameters 22 associated with a respective cohort. Examples of template profiles 56A, 56B, 56C, each including respective calibration parameters 22A, 22B, 22C, are shown in FIG. 2. A plurality of template profiles 56n are communicated to the template profile classifier 54, which determines a template profile 56 for the touch driver 14 based at least in part on the touch input parameters 26 of the user's touch input 20.

The template profile 56 provides a starting point for the calibration parameters 22 used by the touch driver 14 to process the run-time touch input 20. As the touch driver 14 continues to receive and process touch input 20 from the user, the touch driver enhancer artificial intelligence model 28 is configured to receive touch input parameters 26 from the touch driver 14 and output updated calibration parameters 32 included in the personalized user touch driver profile 30 to enhance the user experience during the human-computer interaction.

Figure 3:
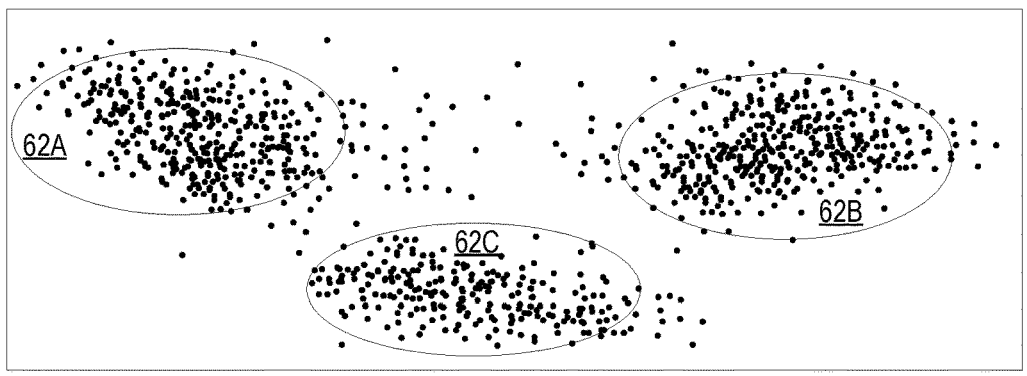
FIG. 3 is an illustration of user clusters identified via a clustering algorithm of the computing system of FIG. 1.

Turning to FIG. 3, examples of user clusters 62A, 62B, 62C derived from the clustering algorithm 60 are shown. As described above, touch input parameters 26 associated with the touch input 20 may be collected as crowd data 58 from a plurality of users at run-time. The crowd data 58 may be sent to a storage device in the cloud where it is analyzed and used for touch driver 14 updates. Additionally or alternatively, the crowd data 58 may be collected from a plurality of users to curate training phase touch input parameters 66 that are used in an initial training phase of the touch driver enhancer artificial intelligence model 28. In this implementation, the one or more processors 18 are configured to received training phase touch input parameters 66 associated with touch input from a plurality of users and instruct the clustering algorithm 60 to interpret the training phase touch input parameters 66. A plurality of user clusters 62 are identified, with each user cluster 62 defining a cohort of users having similar training phase touch input parameters 66. For example, the cohorts may be clustered according to similarities detected in digit size, handedness, inking smoothness, stroke speed, stutter, latency, accuracy, repeatability, pressure, tilt, and/or azimuth. The clustering of cohorts of users having similar characteristics and the resulting plurality of template profiles 56n can be used to initially create the template profile 56 for the user, thereby reducing the number of touch inputs and time required to calibrate the touch driver 14 and create the personalize touch driver profile 30.

Figure 4:
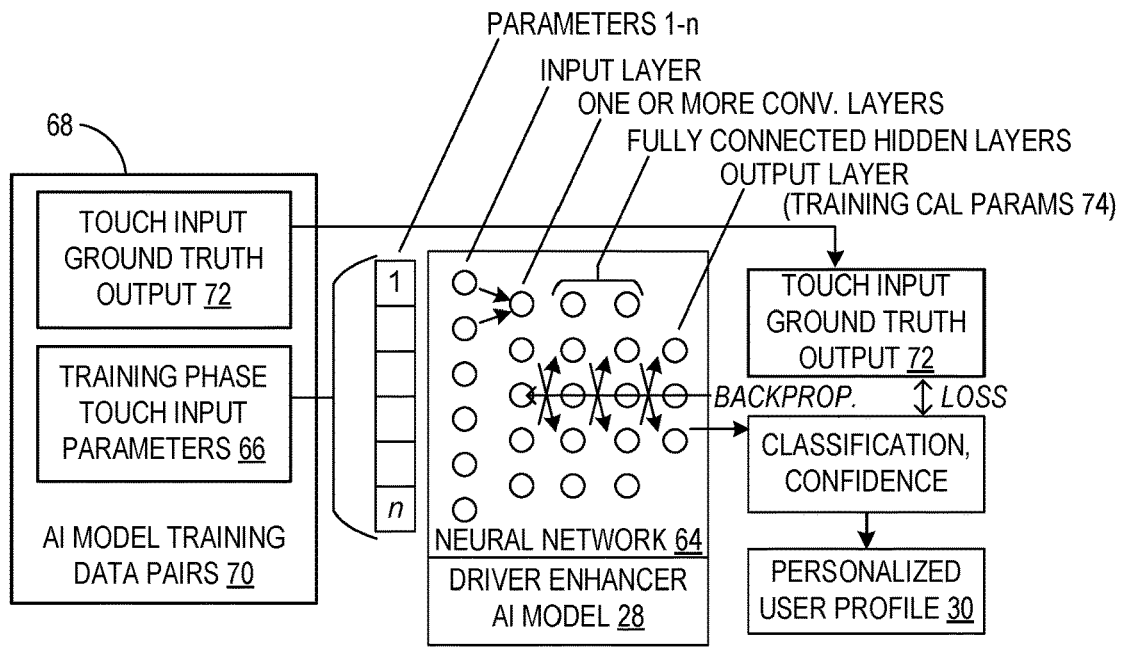
FIG. 4 is a schematic diagram of a touch driver enhancer artificial intelligence model of the computing system of FIG. 1 during an initial training phase.

As indicated above, the touch driver enhancer artificial intelligence model 28 is trainable. Accordingly, FIG. 4 shows a schematic diagram of the touch driver enhancer artificial intelligence model 28 during an initial training phase. In the initial training phase, the touch driver enhancer artificial intelligence model 28 is trained with a training data set 68 including a plurality of training data pairs 70 from a cohort of training data examples derived from a cohort of users, i.e., a user cluster 62, identified via the clustering algorithm 60. Each training data pair 70 includes training phase touch input parameters 66 and ground truth output 72.

The touch driver enhancer artificial intelligence model 28 further includes one or more neural networks 64 that may have an input layer, one or more convolutional layers, one or more fully connected hidden layers, and an output layer. It will be appreciated that the one or more neural networks 64 may be configured to include one or more convolutional layers, one or more fully connected hidden layers, or both one or more convolutional layers and one or more fully connected hidden layers. The input layer includes a plurality of nodes corresponding to the training phase touch input parameters 66, which indicate a characteristic of the training phase touch input 68. The output layer includes a plurality of output nodes corresponding to the ground truth output 72, which indicate training phase calibration parameters 74 for the training data pair 70. Nodes in each layer are linked by weighted associations, and the touch driver enhancer artificial intelligence model 28 is configured to adjust internal weights to enhance one or more of the plurality of calibration parameters 74 via a backpropagation algorithm according to a loss function during training to increase the accuracy of the output nodes during run-time. As described in detail below with reference to FIG. 9, the touch driver enhancer artificial intelligence model 28 may include a first neural network 64A configured to output X coordinate offset and Y coordinate offset of the touch input 20. The touch driver enhancer artificial intelligence model 28 may further include a second neural network 64B configured to output a tilt offset and an azimuth offset, which together define an angle of the stylus 20A that contributes to a thickness of the touch input 20. Additionally or alternatively, in use-case scenarios in which the touch input is performed with a digit or hand of the user, the touch driver enhancer artificial intelligence model 28 may include a neural network configured to output offsets related to hand pose.

Figure 5:
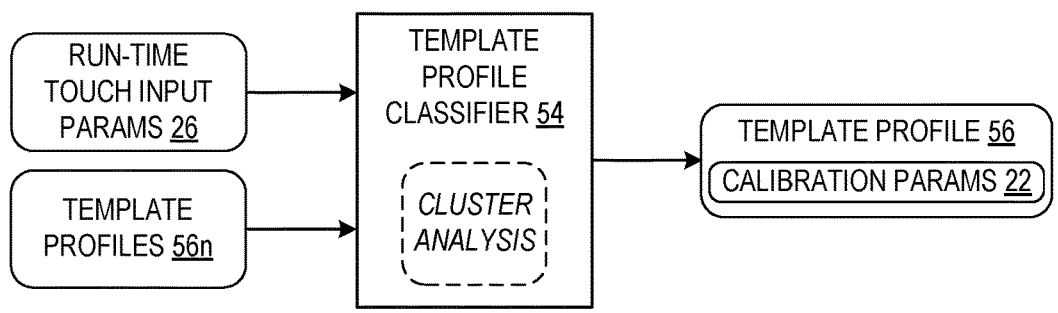
FIG. 5 is a schematic diagram of a template profile classifier of the computing system of FIG. 1 during a run-time phase.

A schematic diagram of the template profile classifier 54 during a run-time phase is shown in FIG. 5. As described above with reference to FIG. 2, the template profile classifier 54 receives run-time touch input parameters 26, classifies them according to a plurality of user template profiles 56n based at least in part on cohorts of users, and outputs a template profile 56 for the user performing the touch input 20. Accordingly, at run-time, the template profile classifier 54 is configured to perform cluster analysis on the run-time touch input parameters 26 to determine the cohort of users with which the user is associated. The template profile classifier 54 then outputs the template profile created for the determined cohort and sets the calibration parameters 22 for the personalized user touch driver profile 30 according to the calibration parameters 22 included in the template profile 56 associated with the determined cohort of users. In this way, the calibration parameters 22 used by the touch driver 14 to process the touch input 20 are based at least in part on template profiles 56n of cohorts of users having characteristics similar to that of the user. For example, the template profile classifier 54 may determine that the user's touch input is similar to that of cohorts of users that are right-handed and have a moderate stroke speed, and the calibration parameters 22 are then set according to template profiles created for user cohorts having these characteristics. As such, the template profile 56 for the user may be initially set using a plurality of template profiles 56n having characteristics similar to that of the user, thereby reducing the time and effort required to calibrate the touch driver 14. The personalized user touch driver profile 30 continues to be fine-tuned with the touch driver enhancer artificial intelligence model 28 based at least in part on the touch input 20 provided by the user in a feedback training phase.

Figure 6:
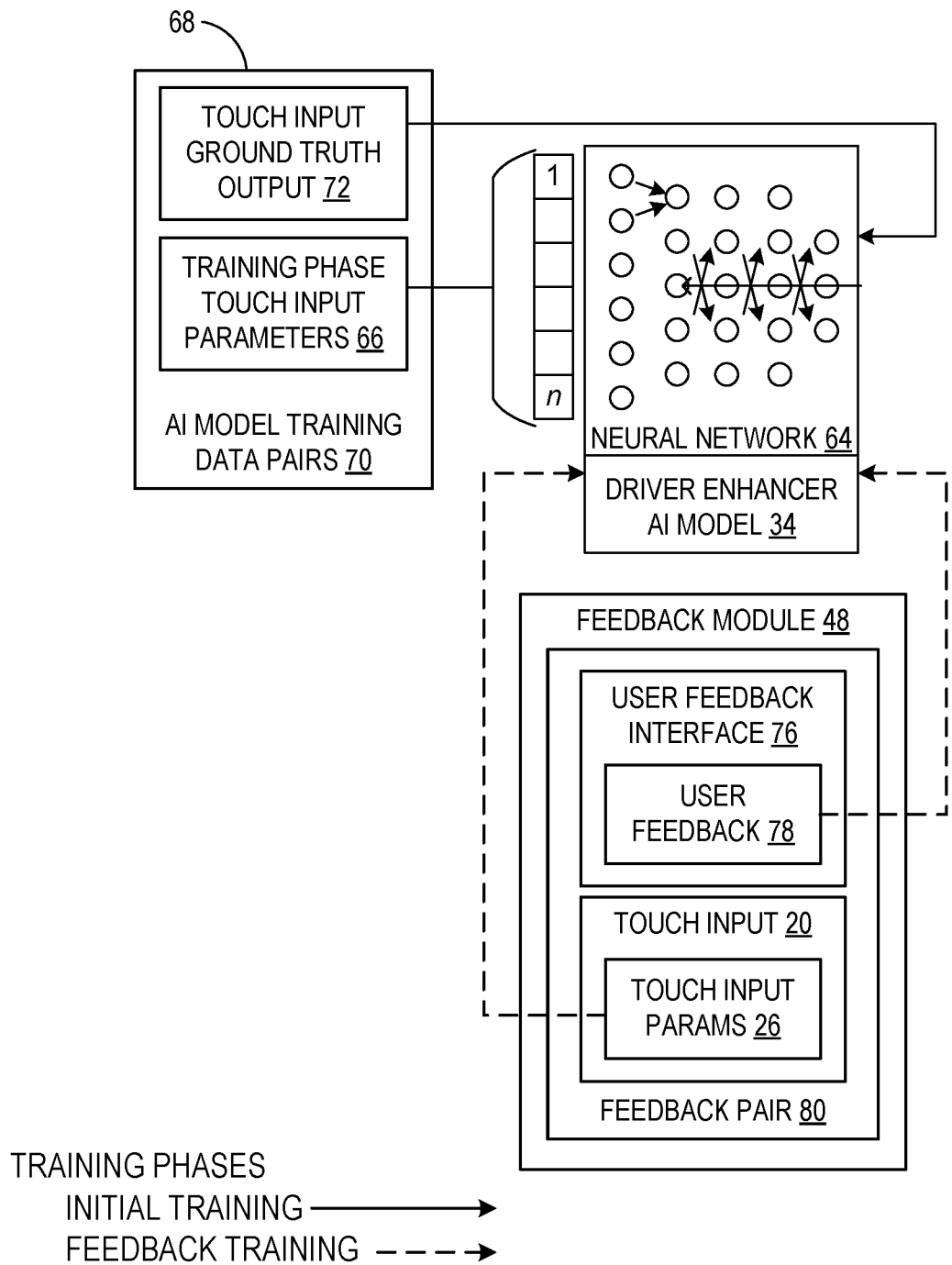
FIG. 6 is a schematic diagram of a touch driver enhancer artificial intelligence model of the computing system of FIG. 1 during initial training and feedback training phases.

Turning to FIG. 6, a schematic diagram of the touch driver enhancer artificial intelligence model 28 during initial training and feedback training phases is illustrated. It will be appreciated that the initial training phase, indicated in FIG. 6 with solid lines, corresponds to the initial training phase described above with reference to FIG. 4. The feedback training phase is indicated in FIG. 6 with dashed lines.

As described above with reference to FIG. 2, the feedback module 48 is configured to communicate the run-time touch input parameters 26 associated with the touch input 20 to the touch driver enhancer artificial intelligence model 28 to enhance the touch driver 14 according to characteristics of the user's touch input 20. As shown, the feedback module 48 may further include a user feedback interface 76 that is configured to collect user feedback 78 that can be used in the feedback training phase. The user feedback 78 may be implicit, such as the user frequently erasing or undoing the touch input 20, or explicit, such as performing touch input calibration exercises and indicating whether the touch input 20 is accurately depicted by the display output 44 shown on the touch-sensitive display 12. As such, the user feedback interface 76 may be configured as one or both of an implicit user feedback interface or an explicit user feedback interface. Together, the user feedback 78 and run-time touch input 20 form a feedback pair 80 with which the touch driver enhancer artificial intelligence model 28 performs feedback training. As with the initial training phase, nodes in each layer of the neural network 64 are linked by weighted associations, the touch driver enhancer artificial intelligence model 28 is configured to adjust internal weights to enhance one or more of the plurality of calibration parameters 22 via a backpropagation algorithm according to a loss function during the feedback training phase.

Figure 7:
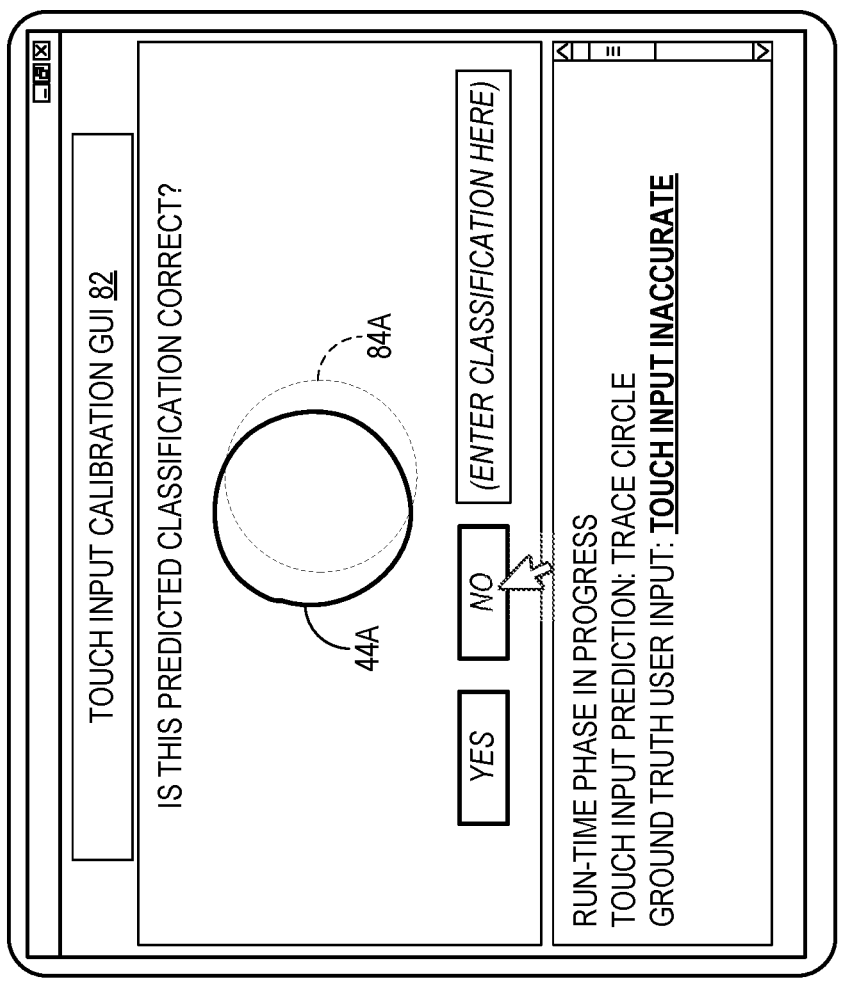
FIGS. 7 and 8 are illustrations of a graphical user interface for touch input calibration of the computing system of FIG. 1.
Figure 8:
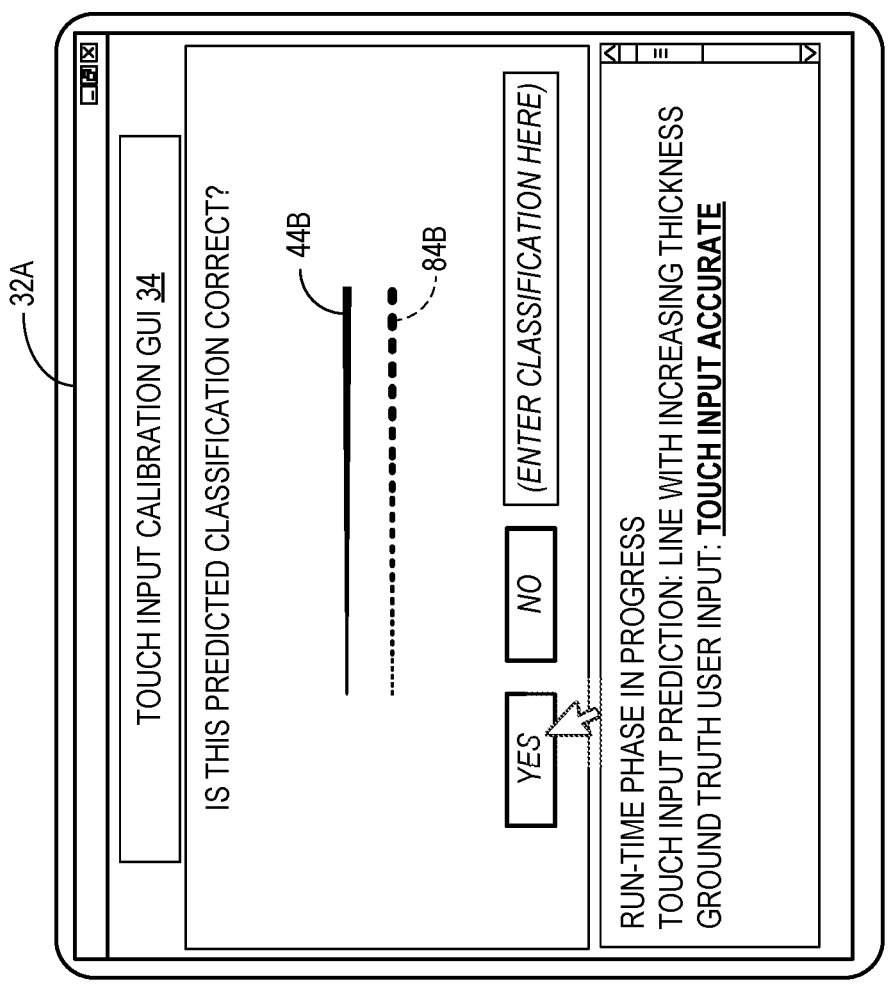

FIGS. 7 and 8 illustrate examples of an explicit user feedback interface 76, which may be presented during a calibration phase and configured as a touch input calibration graphical user interface (GUI) 82. The computing device 10 may be configured to solicit user feedback 78 in conditions such as configuring a new computing device for touch input from a digit or stylus, configuring or updating a user profile, or upon pairing a stylus to the computing device, for example. Additionally or alternatively, the user may access the touch input calibration GUI 82 to provide explicit user feedback 78 when the touch input 20 is not calibrated to their satisfaction.

As shown in the example illustrated in FIG. 7, the calibration phase may be implemented to assess X coordinate and Y coordinate offsets between the touch input 20 and the display output 44. Accordingly, the touch input calibration GUI 82 may be configured to present the user with a calibration graphic 84A to be traced such that the touch input 20 can be processed, and a position of the corresponding display output 44A can be compared to the calibration graphic 84A for accuracy. In FIG. 7, the calibration graphic 84A is depicted with a circle, as indicated by the dashed line. The user performs touch input 20 to trace the calibration graphic 84A, and the touch input 20 is processed and displayed as the display output 44A, indicated by the solid line. The user may additionally provide explicit user feedback 78 based at least in part on how accurately the display output 44 shown on the touch-sensitive display 12 matches the calibration graphic 84A.

FIG. 8 shows an example implementation of the calibration phase for assessing tilt and azimuth offsets between the touch input 20 and the display output 44. As the tilt and azimuth define an angle of the stylus 20A that contributes to a thickness of the touch input 20, the touch input 20 is performed with the stylus 20A in this implementation of the calibration phase Similar to the example described above with reference to FIG. 7, the touch input calibration GUI 82 may be configured to present the user with a calibration graphic 84B such that a thickness of the corresponding display output 44B can be processed and compared to the calibration graphic 84B for accuracy. Accordingly, in FIG. 8, the calibration graphic 84B is depicted as a dashed line increasing in thickness from left to right. The user performs touch input 20 to match the increasing thickness of the calibration graphic 84B, and the touch input 20 is processed and displayed as the display output 44B, indicated by the solid line above the calibration graphic 84B. The user may additionally provide explicit user feedback 78 based at least in part on how accurately the display output 44B shown on the touch-sensitive display 12 matches the calibration graphic 84B.

Additionally or alternatively, the calibration graphic 84 displayed on the touch input calibration GUI 82 during the calibration phase may be configured to assess X coordinate and Y coordinate offsets concurrently with tilt and azimuth offsets. In any implementations of the calibration phase, the explicit user feedback 78 may be processed by the feedback module 48 and sent to the touch driver enhancer artificial intelligence model 28, which outputs the personalized user touch driver profile 30 enhanced according to the explicit user feedback 78, including a plurality of updated calibration parameters 32 for the touch driver 14.

Figure 9:
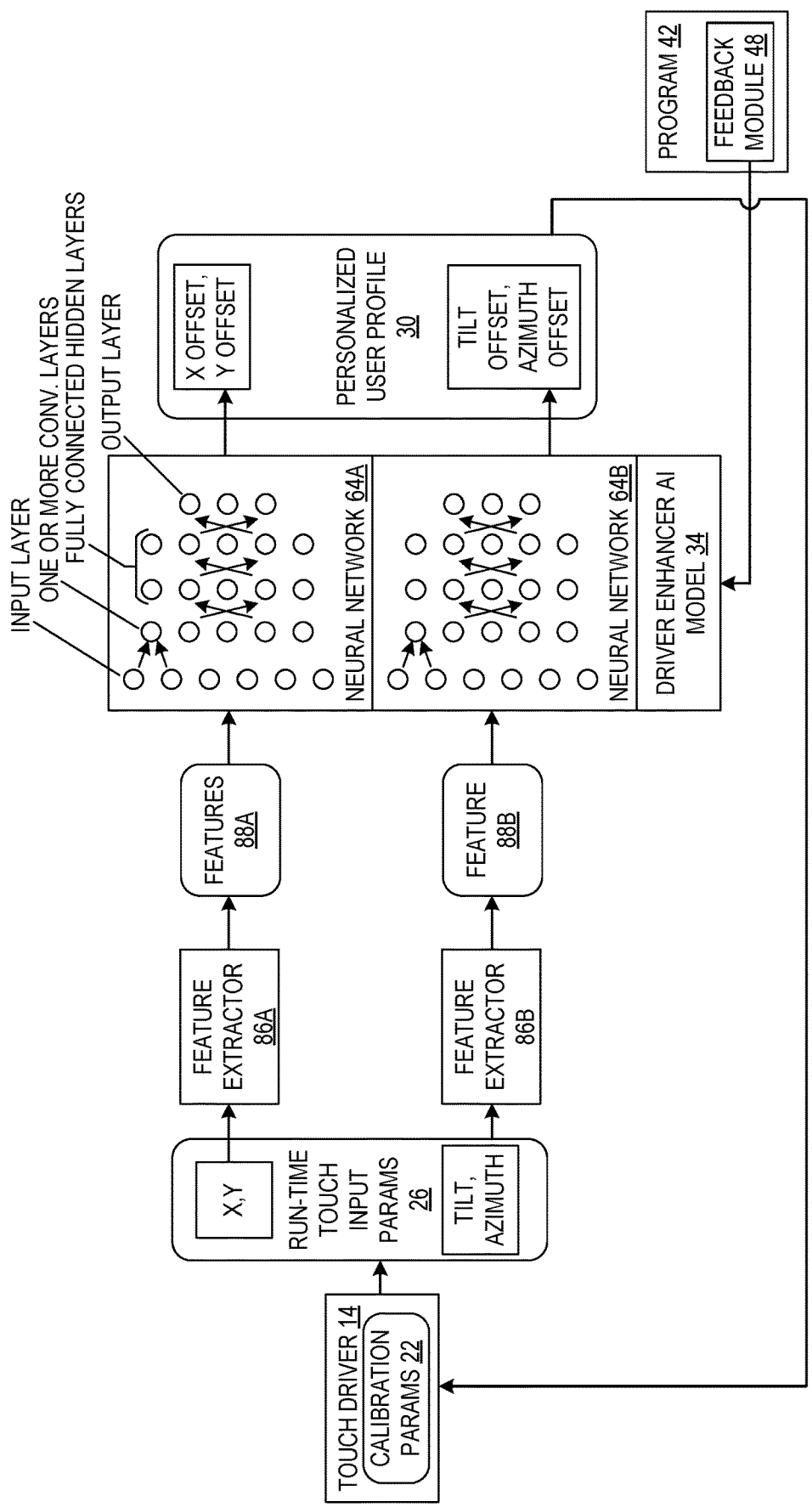
FIG. 9 is a schematic diagram of a touch driver enhancer artificial intelligence model of the computing system of FIG. 1 during a run-time phase.

As indicted above and illustrated in FIG. 9, the touch driver enhancer artificial intelligence model 28 may include the first neural network 64A configured to output X coordinate offset and Y coordinate offset of the touch input 20, and the second neural network 64B configured to output a tilt offset and an azimuth offset. Each neural network has an input layer, one or more fully connected hidden layers, and an output layer. As described above with reference to FIG. 2, upon processing the run-time touch input 20, the touch driver 14 is configured to output the touch event 24 and a plurality of run-time touch input parameters 26 indicating characteristics associated with the touch input event 24. The touch input parameters 26 are recorded in the log 50 as raw input values for user touch input 20 on the touch-sensitive display 12.

As shown in FIG. 9, feature extractors 86A, 86B are configured to extract respective touch input features 88A, 88B from raw input values of the touch input parameters 26, and the extracted features 88A, 88B comprise the plurality of nodes included in the input layers for the respective neural networks 64A, 64B. The touch driver enhancer artificial intelligence model 28 then outputs a personalized user touch driver profile 30, including updated calibration parameters according to the X coordinate and Y offsets coordinate output by the neural network 64A and the tilt and azimuth offsets output by the neural network 64B. It will be appreciated that the output can be considered in terms of a difference between an initial center of mass from the touch input parameters 26 to a target position of the touch input 20 on the touch-sensitive display 12.

Figure 10:
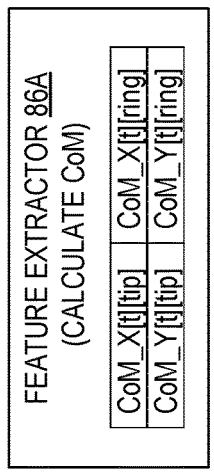
FIG. 10 shows the extraction of features from run-time touch input parameters of the computing system of FIG. 1.
Figure 10:
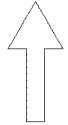
Figure 10:
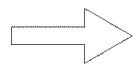

An example of the extraction of features 88A for the neural network 64A is shown in FIG. 10. In the illustrated example, the touch input parameters 26 are recorded as raw input values comprising nine magnitudes of the touch input 20 signal in X, Y, and time (t) for a tip of the stylus 20A and for a ring of the stylus 20A. The touch input parameters 26 are processed by the feature extractor 86A to calculate the center of mass (CoM) in X, Y, and time (t) for each of the tip and the ring. The calculations for the CoM are then used to create the extracted features 88A, including CoM in terms of speed and angle, that are used as the input layer for the neural network 64A. While the example shown in FIG. 10 is for determining the X coordinate and Y coordinate offsets, it will be appreciated that the tilt and azimuth offsets are determined by the neural network 64B using similar calculations.

Figure 11:
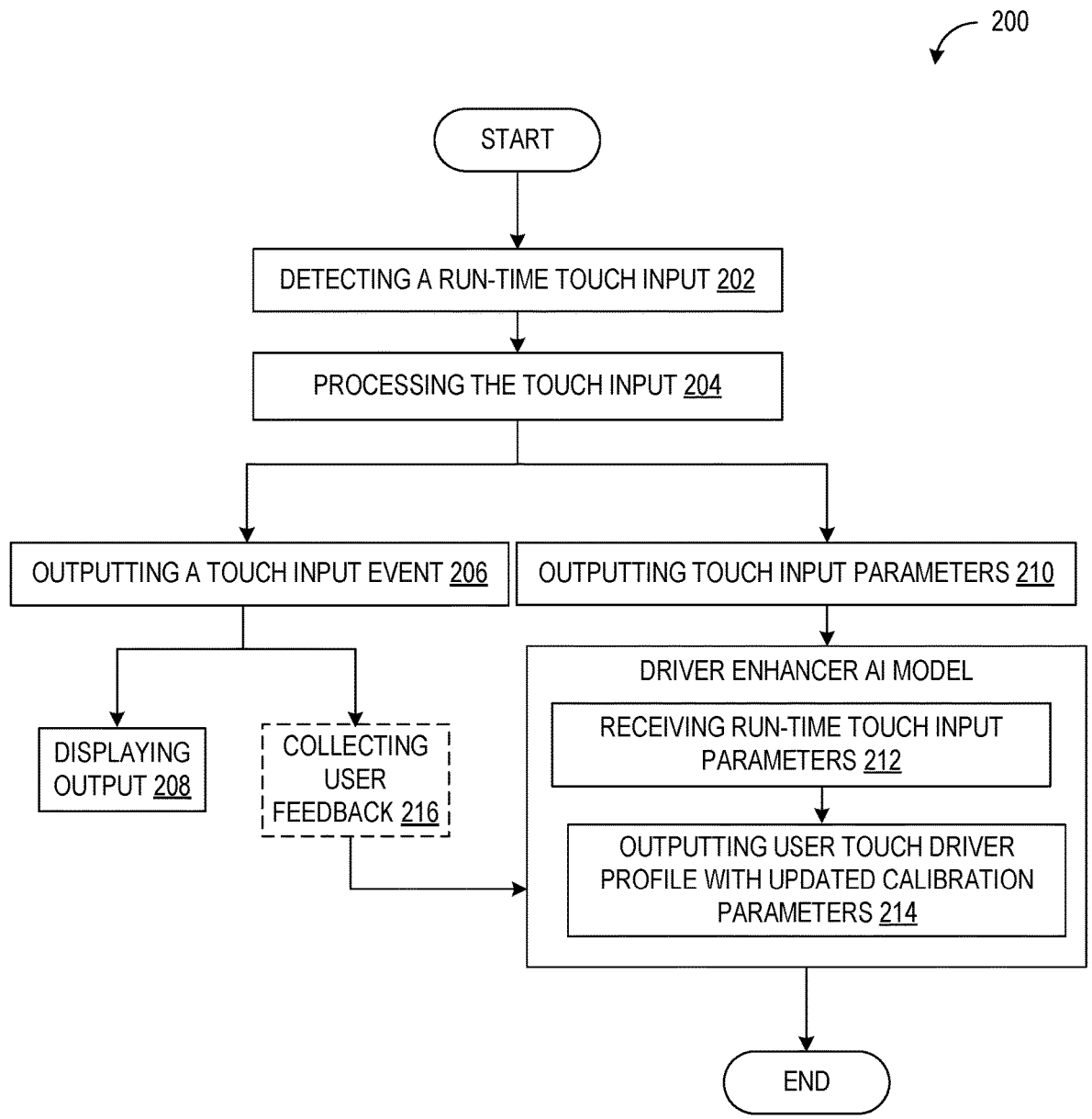
FIG. 11 is a flowchart of a method for enhancing a touch driver operation according one example configuration of the present disclosure.

FIG. 11 is a flowchart of a method 200 for enhancing a touch driver operation according one example configuration of the present disclosure. Method 200 is preferably implemented by one or more processors of a computing system including a touch-sensitive display configured to detect a run-time touch input from a user.

At step 202, the method 200 may comprise detecting a run-time touch input on a touch-sensitive display. The run-time touch input may be received from a digit or a stylus of a user. Accordingly, the touch-sensitive display may be configured as a capacitive touch screen equipped with a plurality of conductive layers. The touch-sensitive display may further include a digitizer layer that enables the computing device to be used with an active stylus, such as a digital pen. The touch input may be detected via sensors, such as touch sensors that detect stimulation of an electrostatic field of the touch-sensitive display and/or sensors in the digitizer layer.

Continuing from step 202 to step 204, the method 200 may include processing the run-time touch input. The touch input may be processed by a touch driver based at least in part on a plurality of calibration parameters. The calibration parameters may include, for example, X coordinate and Y coordinate offsets based at least in part on the sensed position of the detected touch input and/or tilt and azimuth offsets based at least in part on a sensed thickness of the detected touch input.

Proceeding from step 204 to step 206, the method 200 may include outputting a touch input event. The touch input event may be transferred to an input stack, and an input handler may send it to an application program. The application program may be configured to convert data from the touch input event into a display output that is sent to a display driver. Accordingly, advancing from step 206 to step 208, the method 200 may include displaying output to the user on the touch-sensitive display.

After processing the touch input event at step 204, the method 200 may additionally or alternatively continue to step 210. At step 210, the method 200 may include outputting touch input parameters. The touch input parameters may be recorded in a log and sent to a profile module that includes a touch driver enhancer artificial intelligence model.

Continuing from step 210 to step 212, the method 200 may include, receiving, by the touch driver enhancer artificial intelligence model, the run-time touch input parameters. The run-time touch input parameters may be characteristics associated with the touch input event, such as measurements of digit size, handedness, inking smoothness, stroke speed, stutter, latency, accuracy, repeatability, pressure, tilt, and azimuth, for example.

Proceeding from step 212 to 214, the method 200 may include outputting, by the touch driver enhancer artificial intelligence model, a personalized user touch driver profile. The personalized user touch driver profile be based at least in part on the run-time touch input parameters associated with the user's touch input, and may include updated calibration parameters. The updated calibration parameters may be sent to the touch driver such that the touch driver may be updated with the personalized user touch driver profile.

In some implementations, the application program may include a feedback module. As such, after outputting the touch input event at step 206, the method 200 may include collecting user feedback at step 216. The feedback module may be configured to collect user feedback and communicate user feedback associated with the touch input to the touch driver enhancer artificial intelligence model where it may be used to enhance the touch driver according to characteristics of the user's touch input.

Figure 12:
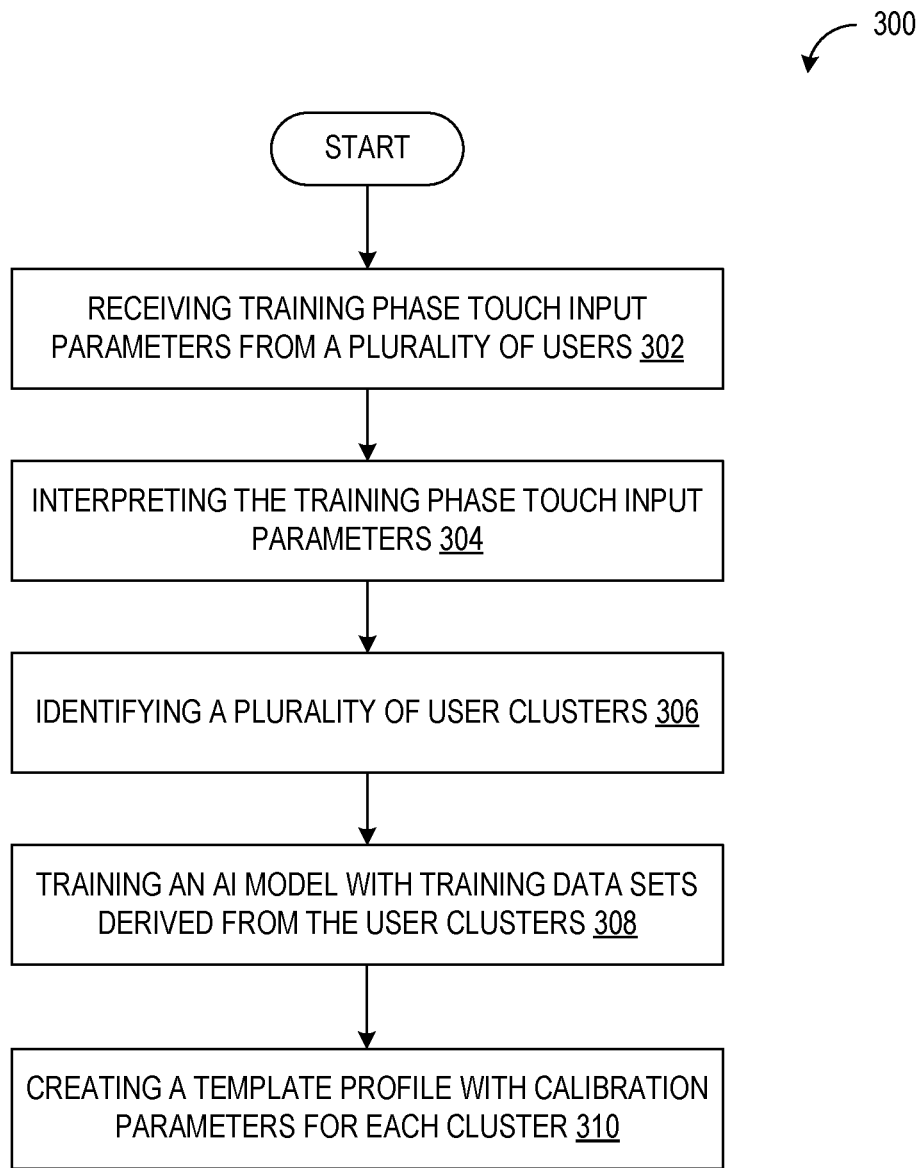
FIG. 12 is a flowchart of a method for training a touch driver enhancer artificial intelligence model according one example configuration of the present disclosure.

FIG. 12 is a flowchart of a method 300 for training a touch driver enhancer artificial intelligence model according one example configuration of the present disclosure. The method 300 is preferably implemented on an artificial intelligence model for a computing system having a touch-sensitive display configured to detect touch input from a user.

At step 302, the method 300 may comprise receiving training phase touch input parameters from a plurality of users. Touch input parameters may be characteristics associated with touch input, such as measurements of digit size, handedness, inking smoothness, stroke speed, stutter, latency, accuracy, repeatability, pressure, tilt, and azimuth, for example. These parameters may be collected from a plurality of users to be processed for training the artificial intelligence model.

Continuing from step 302 to step 304, the method 300 may include interpreting the training phase touch input parameters. The training phase touch input parameters may be interpreted with a clustering algorithm.

Proceeding from step 304 to step 306, the method 300 may include identifying a plurality of user clusters. Touch input parameters from the plurality of users may be grouped by like characteristics by the clustering algorithm to identify user clusters. As such, each user cluster may define a cohort of users having similar training phase touch input parameters. For example, the cohorts may be clustered according to similarities detected in digit size, handedness, inking smoothness, stroke speed, stutter, latency, accuracy, repeatability, pressure, tilt, and/or azimuth.

Advancing from step 306 to step 308, the method 300 may include training the artificial intelligence model with training data sets derived from the user clusters. The training data sets may include a plurality of training data pairs from a cohort of training data examples derived from respective a cohort of users, i.e., a user cluster identified via the clustering algorithm. Each training data pair may include training phase touch input parameters and ground truth output.

Continuing from step 308 to step 310, the method 300 may include creating a template profile with calibration parameters for each user cluster. Template profiles are created for each cohort of users, with each template profile including calibration parameters associated with a respective cohort. A plurality of template profiles may be communicated to a template profile classifier, which determines a template profile for the touch driver at run-time based at least in part on the touch input parameters of a user's touch input. The template profile provides a starting point for the calibration parameters used by the touch driver to process the run-time touch input such that a personalized user touch driver profile may be created.

In some embodiments, the methods and processes described herein may be tied to a computing system of one or more computing devices. In particular, such methods and processes may be implemented as a computer application program or service, an application-programming interface (API), a library, and/or other computer program product.

Figure 13:
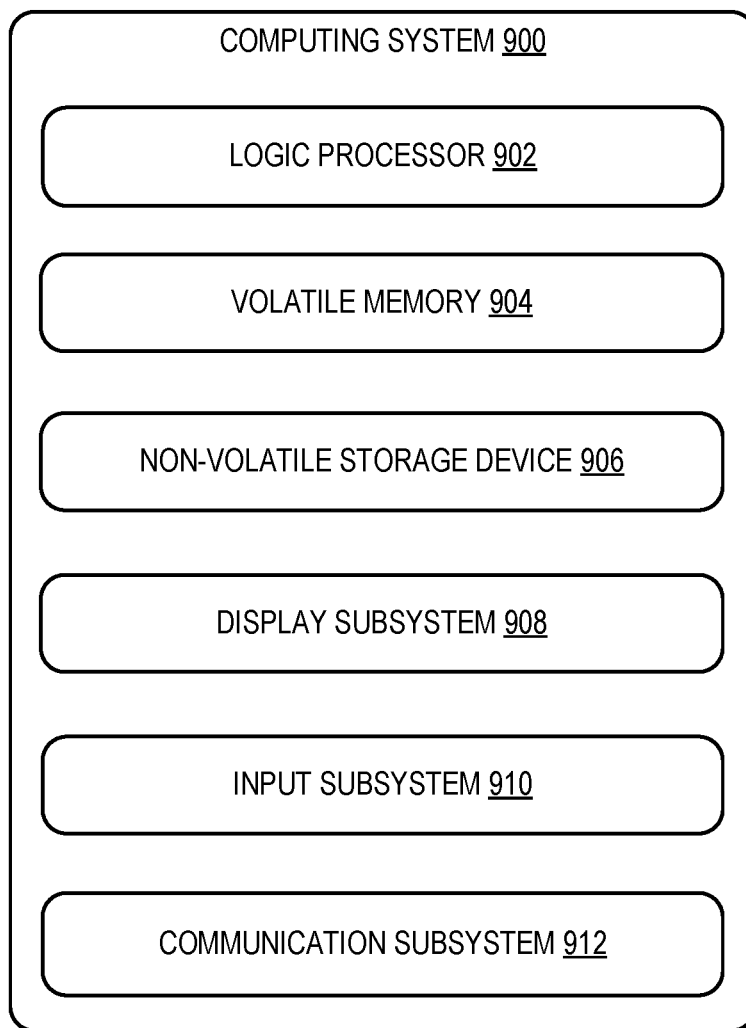
FIG. 13 is an example computing system according to one implementation of the present disclosure.

FIG. 13 schematically shows a non-limiting embodiment of a computing system 900 that can enact one or more of the methods and processes described above. Computing system 900 is shown in simplified form. Computing system 900 may embody the computing device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 13.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional description of aspects of the present disclosure. One aspect provides a computing system for enhancing a touch driver operation. The computing system may comprise a touch-sensitive display and one or more processors. The touch-sensitive display may be configured to detect a run-time touch input from a user. The one or more processors may be configured to execute instructions using portions of associated memory to implement a touch driver of the touch-sensitive display and an artificial intelligence model. The touch driver of the touch-sensitive display may be configured to process the run-time touch input based at least in part on a plurality of calibration parameters, and output a touch input event and a plurality of run-time touch input parameters associated with the touch input event. The artificial intelligence model may be configured to receive, as input, the run-time touch input parameters. Responsive to receiving the run-time touch input parameters, the artificial intelligence model may output a personalized user touch driver profile including a plurality of updated calibration parameters for the touch driver.

In this aspect, additionally or alternatively, in an initial training phase, the one or more processors may be configured to receive training phase touch input parameters from a plurality of users, and instruct a clustering algorithm to interpret the training phase touch input parameters and identify a plurality of user clusters, each user cluster defining a cohort of users.

In this aspect, additionally or alternatively, the artificial intelligence model may have been trained in the initial training phase with a training data set including a plurality of training data pairs from a cohort of training data examples derived from a cohort of users. Each training data pair may include training phase touch input parameters indicating a characteristic of the touch input and ground truth output indicating calibration parameters for the paired touch input parameters. In this aspect, additionally or alternatively, the one or more processors may be configured to create a template profile for each cohort of users. Each template profile may include calibration parameters associated with a respective cohort.

In this aspect, additionally or alternatively, in a run-time phase, the one or more processors may be configured to perform cluster analysis on the run-time touch input parameters to determine the cohort of users with which the user is associated, and set the calibration parameters for the personalized user touch driver profile according to the calibration parameters included in the template profile associated with the determined cohort of users.

In this aspect, additionally or alternatively, in a feedback training phase, the artificial intelligence model may be configured to collect user feedback via an implicit or explicit user feedback interface, and perform feedback training of the artificial intelligence model based at least in part on the user feedback. In this aspect, additionally or alternatively, the artificial intelligence model may be configured to adjust internal weights to enhance one or more of the plurality of calibration parameters via a backpropagation algorithm.

In this aspect, additionally or alternatively, the touch input parameters may be recorded as raw input values for user touch input on the touch-sensitive display, and touch input features may be extracted from the raw input values.

In this aspect, additionally or alternatively, the artificial intelligence model may include one or more neural networks. In this aspect, additionally or alternatively, a first neural network of the one or more neural networks may be configured to output an X coordinate offset and a Y coordinate offset of the touch input. In this aspect, additionally or alternatively, a second neural network of the one or more neural networks may be configured to output a tilt offset and an azimuth offset of the touch input.

In this aspect, additionally or alternatively, the touch input may be performed with a stylus or one or more digits of the user. In this aspect, additionally or alternatively, the characteristic of the touch input may be associated with at least one of digit size, handedness, inking smoothness, stroke speed, stutter, latency, accuracy, repeatability, pressure, tilt, and azimuth.

Another aspect provides a computing method for enhancing a touch driver operation. The method may comprise, at one or more processors of a computing system including a touch-sensitive display configured to detect a run-time touch input from a user, processing the run-time touch input based at least in part on a plurality of calibration parameters. The method may further include outputting a touch input event and a plurality of run-time touch input parameters associated with the touch input event. The method may further include receiving, as input for an artificial intelligence model, the run-time touch input parameters. Responsive to receiving the run-time touch input parameters, the method may further include outputting, by the artificial intelligence model, a personalized user touch driver profile including a plurality of updated calibration parameters for a touch driver of the touch-sensitive display.

In this aspect, additionally or alternatively, the method may further comprise, in an initial training phase, receiving training phase touch input parameters from a plurality of users, and instructing a clustering algorithm to interpret the training phase touch input parameters and identify a plurality of user clusters, each user cluster defining a cohort of users.

In this aspect, additionally or alternatively, the method may further comprise, in the initial training phase, training the artificial intelligence model with a training data set including a plurality of training data pairs from a cohort of training data examples derived from a cohort of users. Each training data pair may include training phase touch input parameters indicating a characteristic of the touch input and ground truth output indicating calibration parameters for the paired touch input parameters.

In this aspect, additionally or alternatively, the method may further comprise creating a template profile for each cohort of users. Each template profile may include calibration parameters associated with a respective cohort.

In this aspect, additionally or alternatively, the method may further comprise, in a run-time phase, performing cluster analysis on the run-time touch input parameters to determine the cohort of users with which the user is associated, and setting the calibration parameters for the personalized user touch driver profile according to the calibration parameters included in the template profile associated with the determined cohort of users.

In this aspect, additionally or alternatively, the method may further comprise, in a feedback training phase, collecting user feedback via an implicit or explicit user feedback interface, and performing feedback training of the artificial intelligence model based at least in part on the user feedback.

Another aspect provides a computing system for enhancing a touch driver operation. The computing system may comprise a touch-sensitive display and one or more processors. The touch-sensitive display may be configured to detect a run-time touch input from a user. The one or more processors may be configured to execute instructions using portions of associated memory to implement a touch driver of the touch-sensitive display and an artificial intelligence model. The touch driver of the touch-sensitive display may be configured to process the run-time touch input based at least in part on a plurality of calibration parameters, and output a touch input event and a plurality of run-time touch input parameters associated with the touch input event. The artificial intelligence model may be configured to receive, as input, the run-time touch input parameters. Responsive to receiving the run-time touch input parameters, the artificial intelligence model may output a personalized user touch driver profile including a plurality of updated calibration parameters for the touch driver. The artificial intelligence model may include a first neural network configured to output an X coordinate offset and a Y coordinate offset of the touch input. The artificial intelligence model may further include a second neural network configured to output a tilt offset and an azimuth offset of the touch input. In a feedback training phase, the artificial intelligence model may be configured to collect user feedback via an implicit or explicit user feedback interface, and perform feedback training of the artificial intelligence model based at least in part on the user feedback.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for enhancing a touch driver operation, comprising:
    a touch-sensitive display configured to detect a run-time touch input from a user; and
    one or more processors configured to execute instructions using portions of associated memory to implement:
        a touch driver of the touch-sensitive display configured to process the run-time touch input based at least in part on a plurality of calibration parameters, and output a touch input event and a plurality of run-time touch input parameters associated with the touch input event, and
        an artificial intelligence model configured to:
            receive, as input, the run-time touch input parameters; and
            responsive to receiving the run-time touch input parameters:
                perform cluster analysis on the run-time touch input parameters to determine a cohort of users with which the user is associated;
                set calibration parameters for the personalized user touch driver profile according to calibration parameters included in a template profile associated with the determined cohort of users; and
                output a personalized user touch driver profile including a plurality of updated calibration parameters for the touch driver.

2. The computing system of claim 1, further comprising:
    a template profile classifier configured to receive the run-time touch input parameters, classify them according to a plurality of user template profiles, and output a template profile for the user.

3. The computing system of claim 1, wherein
in an initial training phase, the one or more processors are configured to:
    receive training phase touch input parameters from a plurality of users; and
    instruct a clustering algorithm to interpret the training phase touch input parameters and identify a plurality of user clusters, each user cluster defining a cohort of users.

4. The computing system of claim 3, wherein
the artificial intelligence model has been trained in the initial training phase with a training data set including a plurality of training data pairs from a cohort of training data examples derived from a cohort of users, each training data pair including training phase touch input parameters indicating a characteristic of the touch input and ground truth output indicating calibration parameters for the paired touch input parameters.

5. The computing system of claim 4, wherein
the one or more processors are configured to create a template profile for each cohort of users, each template profile including calibration parameters associated with a respective cohort.

6. The computing system of claim 1, wherein
in a feedback training phase, the artificial intelligence model is configured to:
    collect user feedback via an implicit or explicit user feedback interface, and
    perform feedback training of the artificial intelligence model based at least in part on the user feedback.

7. The computing system of claim 6, wherein
the artificial intelligence model is configured to adjust internal weights to enhance one or more of the plurality of calibration parameters via a backpropagation algorithm.

8. The computing system of claim 1, wherein
the touch input parameters are recorded as raw input values for user touch input on the touch-sensitive display; and
touch input features are extracted from the raw input values.

9. The computing system of claim 1, wherein
the artificial intelligence model includes one or more neural networks.

10. The computing system of claim 9, wherein
a first neural network of the one or more neural networks is configured to output an X coordinate offset and a Y coordinate offset of the touch input.

11. The computing system of claim 10, wherein
a second neural network of the one or more neural networks is configured to output a tilt offset and an azimuth offset of the touch input.

12. The computing system of claim 1, wherein
the touch input is performed with a stylus or one or more digits of the user.

13. The computing system of claim 3, wherein
the characteristic of the touch input is associated with at least one of digit size, handedness, inking smoothness, stroke speed, stutter, latency, accuracy, repeatability, pressure, tilt, and azimuth.

14. A computing method for enhancing a touch driver operation, the method comprising:
    at one or more processors of a computing system including a touch-sensitive display configured to detect a run-time touch input from a user:
        processing the run-time touch input based at least in part on a plurality of calibration parameters,
        outputting a touch input event and a plurality of run-time touch input parameters associated with the touch input event,
        receiving, as input for an artificial intelligence model, the run-time touch input parameters, and
        responsive to receiving the run-time touch input parameters:
            in a run-time phase, performing cluster analysis on the run-time touch input parameters to determine the cohort of users with which the user is associated,
            setting the calibration parameters for the personalized user touch driver profile according to the calibration parameters included in the template profile associated with the determined cohort of users, and outputting, by the artificial intelligence model, a personalized user touch driver profile including a plurality of updated calibration parameters for a touch driver of the touch-sensitive display.

15. The computing method of claim 14, the method further comprising:
in an initial training phase, receiving training phase touch input parameters from a plurality of users, and
instructing a clustering algorithm to interpret the training phase touch input parameters and identify a plurality of user clusters, each user cluster defining a cohort of users.

16. The computing method of claim 15, the method further comprising:
in the initial training phase, training the artificial intelligence model with a training data set including a plurality of training data pairs from a cohort of training data examples derived from a cohort of users, each training data pair including training phase touch input parameters indicating a characteristic of the touch input and ground truth output indicating calibration parameters for the paired touch input parameters.

17. The computing method of claim 16, the method further comprising:
creating a template profile for each cohort of users, each template profile including calibration parameters associated with a respective cohort.

18. The computing method of claim 14, the method further comprising:
in a feedback training phase, collecting user feedback via an implicit or explicit user feedback interface, and
performing feedback training of the artificial intelligence model based at least in part on the user feedback.

19. The computing method of claim 18, the method further comprising:
recording the touch input parameters as raw input values for user touch input on the touch-sensitive display; and
extracting touch input features from the raw input values.

20. A computing system for enhancing a touch driver operation, comprising:
a touch-sensitive display configured to detect a run-time touch input from a user; and
one or more processors configured to execute instructions using portions of associated memory to implement:
a touch driver of the touch-sensitive display configured to process the run-time touch input based at least in part on a plurality of calibration parameters, and output a touch input event and a plurality of run-time touch input parameters associated with the touch input event, and
an artificial intelligence model configured to:
receive, as input, the run-time touch input parameters; and
responsive to receiving the run-time touch input parameters, output a personalized user touch driver profile including a plurality of updated calibration parameters for the touch driver, wherein
the artificial intelligence model includes a first neural network configured to output an X coordinate offset and a Y coordinate offset of the touch input and a second neural network configured to output a tilt offset and an azimuth offset of the touch input,
in an initial training phase, the artificial intelligence model is trained with a training data set including a plurality of training data pairs from a cohort of training data examples derived from a cohort of users, each training data pair including training phase touch input parameters indicating a characteristic of the touch input and ground truth output indicating calibration parameters for the paired touch input parameters, and
in a feedback training phase, the artificial intelligence model is configured to:
collect user feedback via an implicit or explicit user feedback interface, and
perform feedback training of the artificial intelligence model based at least in part on the user feedback.

* * * * *